United States Patent [19]

Kasuga

[11] Patent Number: 4,664,476
[45] Date of Patent: May 12, 1987

[54] MAGNETIC OBJECTIVE LENS DRIVING APPARATUS WITH PIVOT

[75] Inventor: Ikuo Kasuga, Nagano, Japan

[73] Assignee: Kabushiki Kaisha Sankyo Seiki Seisakusho, Nagano, Japan

[21] Appl. No.: 795,704

[22] Filed: Nov. 6, 1985

Related U.S. Application Data

[63] Continuation of Ser. No. 488,910, Apr. 27, 1983, abandoned.

[30] Foreign Application Priority Data

Apr. 27, 1982 [JP] Japan .................................. 57-60480

[51] Int. Cl.⁴ ............................................... G02B 7/02
[52] U.S. Cl. ..................................... 350/252; 350/247
[58] Field of Search ................. 350/247, 255, 6.3, 6.6, 350/252

[56] References Cited

U.S. PATENT DOCUMENTS 4,101,008 7/1978 Frosch et al. ................... 350/255 X
4,473,274 9/1984 Yano et al. ........................... 350/255

FOREIGN PATENT DOCUMENTS 0129605 4/1977 Japan .
0094311 7/1981 Japan .................................. 350/255
0035736 3/1983 Japan .................................. 350/255

Primary Examiner—John K. Corbin
Assistant Examiner—David Lewis
Attorney, Agent, or Firm—Sughrue, Mion, Zinn, Macpeak & Seas

[57] ABSTRACT

A driving apparatus for an objective lens includes an electromagnetic driving device normally holding the objective lens and its support at a neutral position. When a coil of the driving device is energized, the support may be driven so as to pivot about an axis to adjust the position of the lens.

4 Claims, 6 Drawing Figures

MAGNETIC OBJECTIVE LENS DRIVING APPARATUS WITH PIVOT

This is a continuation of Ser. No. 488,910 filed Apr. 27, 1983 now abandoned.

BACKGROUND OF THE INVENTION

The present invention relates to an objective lens driving apparatus for an optical information reader.

In a reader for reproducing a video disc or an audio disc on which optical information has been recorded, it is required to enable the objective lens to move in the lateral direction of the information tracks in order to correct the error in projecting a light spot onto an information track, namely the tracking error. To this end, conventionally, an electromagnetic driving means or the like has been used for driving the objective lens, and a metal plate spring, a rubber elastic member, or the like having strength and stability has been utilized for holding the objective lens. It is difficult, however, to hold the objective lens in a stable state while maintaining high accuracy with such an arrangement because the metal plate spring is apt to suffer spring fatigue or distortion in installation and the characteristics of the rubber elastic body may largely change due to aging or temperature.

SUMMARY OF THE INVENTION

An object of the present invention is to provide an objective lens driving apparatus in which an objective lens is held and driven with the above-mentioned defects in the conventional technique eliminated.

BRIEF DESCRIPTION OF THE DRAWINGS

Embodiments of the present invention will be described with reference to the attached drawings, in which.

DETAILED DESCRIPTION OF THE PREFERRED EMBODIMENTS

Figure 1:
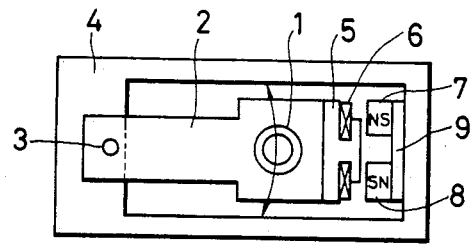
FIG. 1 is a front view of one embodiment of the objective lens driving apparatus according to the present invention.

In FIG. 1, an objective lens 1 is mounted on a lens support member 2 supported at one end on a base 4 by a pin 3 such that the lens support member 2 may pivot in the direction indicated by the arrow. A coil 6 is fixed together with a channel yoke 5 to the lens support member 2 at the other end thereof. A pair of magnets 7 and 8 and a plate-like yoke 9 are fixed on the base 4 at positions opposite to the yoke 5 and the coil 6. The magnets 7 and 8 are disposed such that they are reversed in polarity as shown in the drawing.

The yoke 5, the coil 6, the magnets 7 and 8, and the yoke 9 constitute an electromagnetic driving means for the lens support member 2. That is, upon energization of the coil 6, an electromagnetic force acting as an attractive or repulsive force is produced between the magnets 7 and 8 so as to cause the lens support member 2 to pivot about the axis of pin 3. The tracking error of the objective lens 1 is corrected by this rotation of the objective lens 1. With this electromagnetic driving means, on the other hand, the magnet 7, the yoke 9, the magnet 8, and the yoke 5 constitute a closed magnetic path in a normal state when the coil is not energized, thereby holding the lens support member 2 at the neutral or balanced point of the magnetic force generated in the closed magnetic path. In this embodiment, even if the yoke 9 is eliminated, a weak closed magnetic path can be formed although the magnetic force is reduced, and therefore the yoke 9 may be removed for the purpose of adjusting the magnetic force, or the like. Further, as a matter of course, the same effect may be obtained if the locations of the yoke 5 and the coil 6 are exchanged for the locations of the magnets 7 and 8 and the yoke 9.

Figure 2:
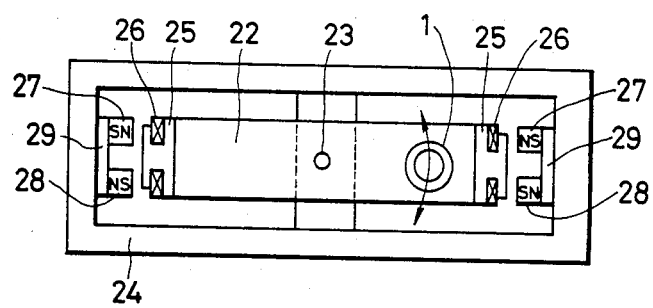
FIG. 2 is a front view of another embodiment of the objective lens driving apparatus according to the present invention.

FIG. 2 shows another embodiment of the present invention, in which a lens support member 22 mounting an objective lens 1 thereon is supported substantially at a central portion on a base 24 by a pin 23 such that the lens support member 22 may pivot about the axis of pin 23 in the direction indicated by the arrow. As shown in the drawing, yokes 25, 25, respectively, together with coils 26, 26 are fixed on the lens support member 22 at the opposite ends thereof. Two pairs of magnets 27, 28; 27, 28, respectively, together with yokes 29, 29 are fixed on the base 24 at suitable locations such that each set of magnets 27, 28 and yoke 29 are opposite to the corresponding coil 26 and yoke 25. The coils 26, 26 are wound such that when the coils 26 and 26 are energized, a rotational couple is generated so as to cause the support member 22 to rotate about the axis of pin 23. The function of the yokes 25, 25, the coils 26, 26, the magnets 27, 27 and 28, 28, and yokes 29, 29, which constitute two electromagnetic driving means, is the same as in the case of FIG. 1 and therefore a description thereof will be omitted.

Although only the objective lens 1 is mounted on the lens support member 2 and 22 in the described embodiments, optical elements such as a polarization prism, a light emitting element and the like may be mounted on the support member together with the objective lens 1.

Figure 3:
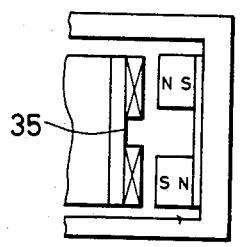
FIGS. 3 to 5 show modifications of the electromagnetic driving means.
Figure 4:
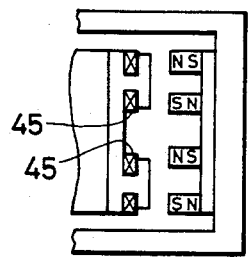
Figure 5:
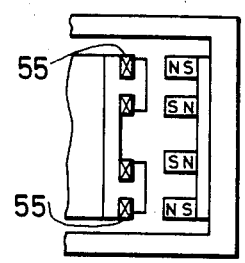

FIGS. 3 to 5 show alternatives or modifications of the above-described electromagnetic driving means. In FIG. 3, the size and strength of the electromagnetic force is reduced by removing the portion of yoke 35 opposite the magnets. In FIGS. 4 and 5, a plurality of electromagnetic driving means are provided to increase the electromagnetic force. In the embodiment of FIG. 4, coils 45 and 45 are wound in the same direction, while in the embodiment of FIG. 5, coils 55 and 55 are wound in opposite direction.

Figure 6:
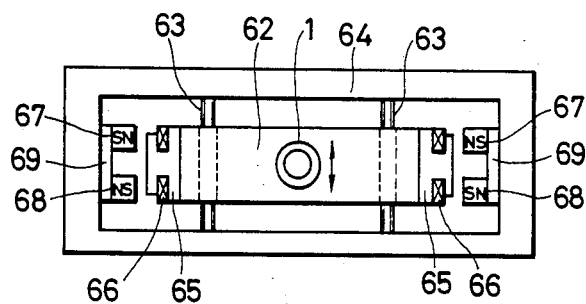
FIG. 6 is a front view showing still another embodiment of the invention.

Still another embodiment of the objective lens driving apparatus according to the present invention will now be described with reference to FIG. 6. In the foregoing embodiments, the objective lens, the support member and the associated means are pivotably mounted on the base. However, in the embodiment shown in FIG. 6, these components are slidably mounted on the base. More specifically, the support member 62 which carries the objective lens 1 is movably mounted on the base 64 along a pair of guide rails 63 as indicated by the arrow in FIG. 6. At either end of the lens support member 62 is fixedly provided a yoke 65 with coils 66. A yoke having a pair of magnets 67 and 68 is affixed in confronting relationship with the yoke 65 with the coils 66.

The coils 66 are wound so that upon the supply of electric current, the objective lens support member 62 is moved to the same direction. With such a construction, substantially the same effect may be obtained, as in the foregoing embodiments.

According to the invention, in an objective lens driving apparatus, as electromagnetic driving means is composed of at least two constituent elements, a magnet and a coil with a yoke, disposed opposite to one another, one of the two constituent elements being fixedly disposed on a lens support member, the other of tne two constituent elements being fixedly disposed on a base, so that the lens support member is normally held at a neutral point of the electromagnetic force of the electromagnetic driving means when the coil is not energized, while the lens support member is pivotably driven by the electromagnetic force of the electromagnetic driving means when the coil is energized. Thus, the electromagnetic driving means may be used to rotationally drive the lens support member as well as to hold the lens support member at a neutral point, so as to reduce the apparatus in size and obtain a stable objective driving apparatus.

What is claimed is:

1. A lens driving apparatus, comprising; electromagnetic driving means composed of at least two elements including magnet means having a support and a pair of spaced magnets of opposite polarity, a coil with a yoke disposed opposite to said pair of magnets, one of said two elements of said electromagnetic driving means being fixedly disposed on a lens support member on which an objective lens is mounted, the other of said two elements being fixedly disposed on a base on which said lens support member is movably supported, said base including a pivot pin for rotatably supporting said lens support member, said magnet means and said yoke arranged so that said lens support member being normally held at a neutral point of the electromagnetic force of said electromagnetic driving means when said coil is not energized, and being driven by the electromagnetic force of said electromagnetic driving means when said coil is energized.

2. An apparatus as claimed in claim 1, wherein said electromagnetic driving means comprises at least two coil and yoke assemblies, each assembly arranged to confront with a pair of magnets having opposite polarity.

3. An apparatus as claimed in claim 1, wherein said magnet means comprises a pair of magnets mounted on said base.

4. An apparatus as claimed in claim 1, wherein said coil confronts said magnet means, and said yoke extending toward said magnet means to approximately the same extent as said coil.

* * * * *